United States Patent [19]

Seager

[11] Patent Number: 5,274,613
[45] Date of Patent: Dec. 28, 1993

[54] WRISTWATCH RADIOTELEPHONE

[75] Inventor: Richard H. Seager, Mystic, Conn.

[73] Assignee: Timex Corporation, Middlebury, Conn.

[21] Appl. No.: 962,355

[22] Filed: Oct. 16, 1992

[51] Int. Cl.$^5$ .................. G04B 47/02; H04M 1/03
[52] U.S. Cl. ..................... 368/13; 368/282; 379/430; 379/434
[58] Field of Search .......... 368/10, 13, 281, 282, 368/278; 224/165; 379/90, 428, 440

[56] References Cited

U.S. PATENT DOCUMENTS

| | | | |
|---|---|---|---|
| 3,032,651 | 5/1962 | Gisiger-Stahl et al. | 250/14 |
| 4,748,604 | 5/1988 | Lambert | 368/282 |
| 4,847,818 | 7/1989 | Olsen | 368/10 |
| 4,985,878 | 4/1991 | Yamada et al. | 360/88 |
| 5,050,138 | 9/1991 | Yamada et al. | 368/10 |

Primary Examiner—Vit W. Miska
Attorney, Agent, or Firm—Robert R. Jackson

[57] ABSTRACT

A combined wristwatch and radiotelephone has a portion such as a wristband which typically remains on the user's wrist, and a timekeeping and radiotelephone portion which is typically removable from the portion that remains on the wrist. The wristwatch and radiotelephone portion is reconfigurable between a relatively compact form in which it is suitable for wearing on the wrist as a wristwatch, and a more elongated form in which it is suitable for use as a hand-held radiotelephone with a microphone and speaker spaced sufficiently far apart to permit simultaneous use of those components adjacent the user's mouth and ear.

20 Claims, 2 Drawing Sheets

WRISTWATCH RADIOTELEPHONE

BACKGROUND OF THE INVENTION

This invention relates to a combined wristwatch and radiotelephone, and more particularly to a wristwatch which can be converted temporarily to a form suitable for use as a hand-held radiotelephone.

Olsen U.S. Pat. No. 4,847,818 shows a wristwatch which can be removed from the user's wrist and temporarily reconfigured for use as a hand-held radiotelephone. The Olsen apparatus has many desirable features, but it would also be desirable to have a structure which forms a somewhat more definite, predetermined shape when reconfigured as a radiotelephone. This would tend to give the article a more substantial "feel" when used as a radiotelephone, thereby making the article more acceptable and attractive to at least some users.

In view of the foregoing, it is an object of this invention to provide a wristwatch radiotelephone which can be made to positively assume a definite shape of a first kind when configured for use as a wristwatch, and which can similarly be made to positively assume a definite shape of a second kind when configured for use as a radiotelephone.

SUMMARY OF THE INVENTION

This and other objects of the invention are accomplished in accordance with the principles of the invention by providing a wristwatch radiotelephone which includes a timekeeping and radiotelephone portion removably mounted on a wristband portion. When the timekeeping and radiotelephone portion is mounted on the wristband portion, the apparatus looks and functions like a conventional wristwatch. When the timekeeping and radiotelephone portion is removed from the wristband portion, however, the timekeeping and radiotelephone portion can be reconfigured to an elongated form which is suitable for use as a hand-held radiotelephone. In particular, the elongated structure includes a radiotelephone microphone adjacent one axial end, and a radiotelephone speaker adjacent the other axial end. The distance between these two components is great enough so that when the elongated structure is held alongside the user's face, the microphone is adjacent the user's mouth and the speaker is adjacent the user's ear, thereby making it possible to use both components simultaneously as in a conventional telephone.

Further features of the invention, its nature and various advantages will be more apparent from the accompanying drawings and the following detailed description of the preferred embodiments.

DETAILED DESCRIPTION OF THE PREFERRED EMBODIMENTS

Olsen U.S. Pat. No. 4,847,818, which is hereby incorporated by reference herein, shows all of the electronic components and circuitry needed for a wristwatch radiotelephone. All of those same components and circuitry can be used in a wristwatch radiotelephone constructed in accordance with the present invention. Accordingly, it will not be necessary to repeat here any of the details regarding that portion of the apparatus.

Figure 1:
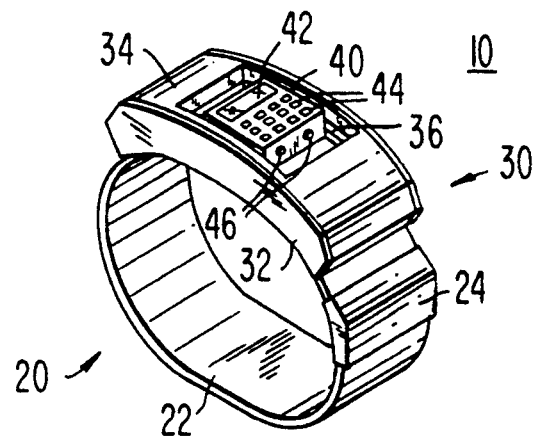
FIG. 1 is a simplified perspective view of an illustrative embodiment of a wristwatch radiotelephone constructed in accordance with the principles of this invention in the wristwatch configuration.
Figure 2:
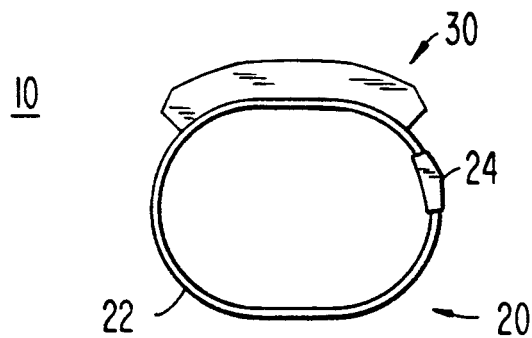
FIG. 2 is a simplified elevational view of the apparatus of FIG. 1.
Figure 3:
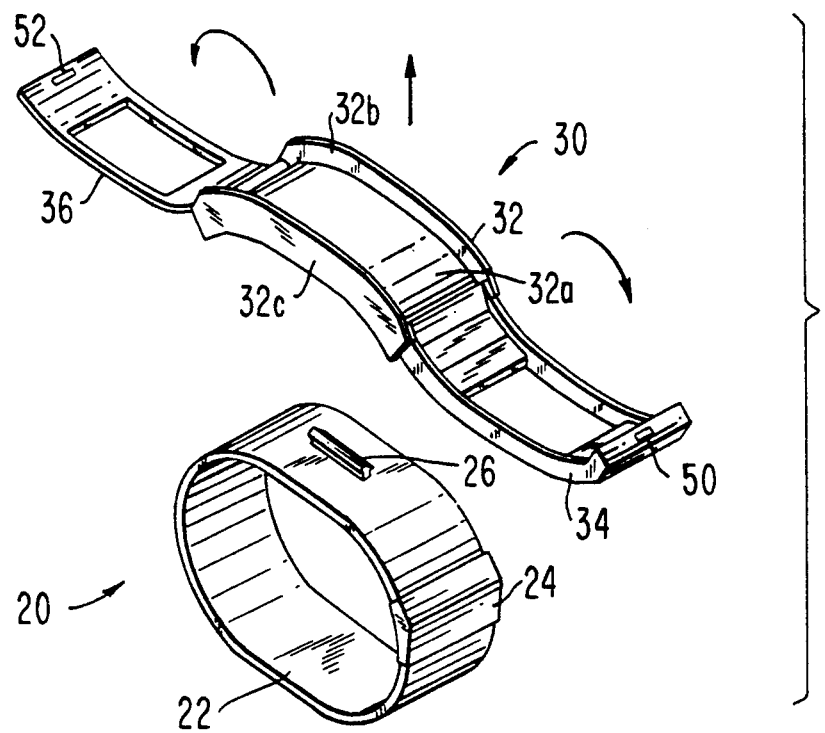
FIG. 3 is a simplified perspective view of the apparatus of FIG. 1 with the timekeeping and radiotelephone portion removed from the wristband portion and opened out for use as a radiotelephone. The portion of the structure including the display, the telephone dialing keypad, and the control buttons is omitted from FIG. 3.
Figure 4:
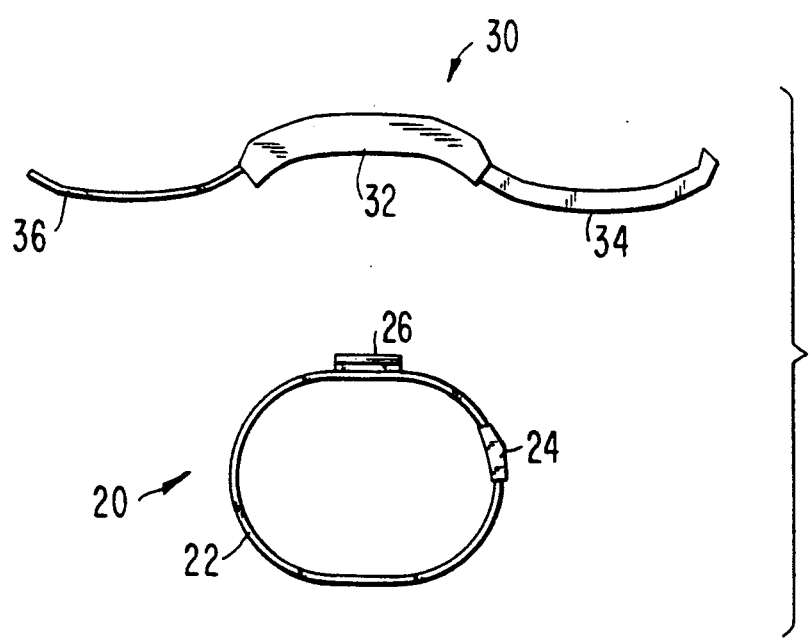
FIG. 4 is a simplified elevational view of the apparatus of FIG. 3.

As shown in FIGS. 1 and 2, an illustrative embodiment of the wristwatch radiotelephone 10 of this invention includes an annular wristband portion 20 and a timekeeping and radiotelephone portion 30 removably mounted on one side of the wristband portion. In the depicted preferred embodiment wristband portion 20 is a somewhat flexible plastic strap 22 with a length adjustment portion 24 so that the strap can be adjusted to fit snugly but comfortably on wrists of various sizes. It will be readily apparent, however, that wristband portion 20 could alternatively be constructed in many other ways. As can be seen in FIGS. 3 and 4, wristband portion 20 includes an arrowhead snap 26 on one side for removably securing timekeeping and radiotelephone portion 30 to the wristband. Arrowhead snap 26 fits into a mating recess (not shown) in the underside of portion 30. This structure holds portion 30 securely to portion 20 but allows the user to pull portion 30 off portion 20 whenever desired.

As is best seen in FIG. 3, timekeeping and radiotelephone portion 30 has a main body member 32, a first end member 34 pivotally connected adjacent one of its ends to one end of member 32, and a second end member 36 pivotally connected adjacent one of its ends to the other end of member 32. All of members 32, 34, and 36 are similarly arcuate so that they generally follow the top of the user's wrist when the apparatus is worn as a wristwatch. End member 36 can be pivoted relative to member 32 so that it overlies the bottom 32a of member 32 between the two radially outwardly extending flanges 32b and 32c of member 32. End member 34 can be similarly pivoted relative member 32 so that it overlies member 36 and the bottom 32a of member 32 also between flanges 32b and 32c. If desired, end member 34 may releasably latch to the other members when folded over the other members as shown in FIGS. 1 and 2. This prevents end members 34 and 36 from folding out except when this is specifically desired by the user.

Although shown only in FIG. 1, a display and keypad element 40 is permanently mounted on the center of the bottom 32a of member 32. Element 40 includes a digital display area 42 (e.g., for displaying the time of day), a telephone dialing keypad area 44, and additional buttons 46 for controlling the timekeeping and radiotelephone functions of the apparatus. (Elements 42, 44, and 46 are respectively similar to elements 10, 12, and 11 in the above-mentioned Olsen patent.) Each of members 34 and 36 has a central cut-out through which element 40 extends when members 34 and 36 are folded in against member 32 as shown in FIGS. 1 and 2. In this condition timekeeping and radiotelephone portion 30 forms an extremely compact structure which extends over only one side of wristband portion 20.

When it is desired to use the apparatus as a radiotelephone, portion 30 is removed from wristband portion 20 by pulling portion 30 off arrowhead snap 26. (Wristband portion 20 can be left on the user's wrist.) The user then pivots each of end members 34 and 36 out from member 32 approximately 180° as shown in FIGS. 3 and 4. If desired, the pivotal connections of each of end members 34 and 36 to main member 32 may allow only a predetermined limited amount of pivotal motion of the end members relative to the main member. For example, in the depicted preferred embodiment the pivotal connections between main member 32 and end members 34 and 36 allow the end members to pivot out only approximately 180° relative to main member 32. Also, if desired, the pivotal connections between main member 32 and end members 34 and 36 may include detents for releasably holding the end members in the fully pivoted out position. If provided, such detents help to hold portion 30 of the apparatus in the elongated radiotelephone form shown in FIGS. 3 and 4 when the user places portion 30 in that form. Pivotal connections of the general type described above are shown and described in further detail in commonly assigned, concurrently filed applications Ser. No. 07/961,656 (now Seager U.S. Pat. No. 5,218,577) and Ser. No. 07/963,411, which are hereby incorporated by reference herein. Alternatively, frictional engagement between main member 32 and end members 34 and 36 may be used to hold these members in whatever relative positions they are manually placed.

In the elongated form shown in FIGS. 3 and 4, portion 30 is suitable for use as a hand-held radiotelephone. In particular, when the user holds elongated portion 30 alongside his or her face, a radiotelephone microphone 50 near the free end of end member 34 will be adjacent the user's mouth, while a radiotelephone speaker 52 near the free end of end member 36 is simultaneously adjacent the user's ear. Elements 50 and 52 are respectively similar to elements 6 and 8 in the above-mentioned Olsen patent.

After portion 30 has been used as a radiotelephone, the apparatus can be returned to the wristwatch form by pivoting end member 36 in over main member 32, and then pivoting end member 34 in over the other two members. Portion 30 can then be re-attached to wristband portion 20 via arrowhead snap 26.

Figure 5:
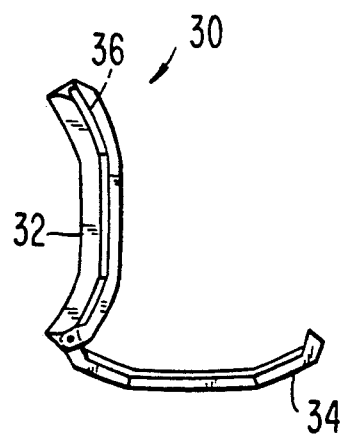
FIG. 5 is a simplified elevational view of just the timekeeping and radiotelephone portion of the apparatus of FIG. 1 in a partly unfolded configuration suitable for use as a clock resting on another surface such as a desktop.

If desired, when portion 30 is removed from wristband portion 20, it can alternatively be used as a small clock as shown in FIG. 5. For this use, end member 34 is pivoted out from the two other members by approximately 90°. Portion 30 can then be put down on another surface such as a desktop so that end member 34 rests on the desktop and the other members are vertical, thereby exposing display 42 to view. Again, a releasable detent may be associated with the pivotal connection between members 32 and 34 at the 90° position to help portion 30 maintain the configuration shown in FIG. 5. Friction between members 32 and 34 may alternatively be used to help portion 30 maintain the FIG. 5 configuration.

It will be understood that the foregoing is merely illustrative of the principles of the invention, and that various modifications can be made by those skilled in the art without departing from the scope and spirit of the invention. For example, it is not essential that portion 30 be removed from portion 20 during use of portion 30 as a radiotelephone. Portion 30 could alternatively remain on portion 20, with both portions being removed from the wrist. As another example of a modification within the scope of the invention, the auxiliary members like members 34 and 36 could alternatively be connected to main member 32 by means other than the pivotal connections employed in the depicted embodiment. For example, the auxiliary members could pull out of the main member in telescoping fashion. Suitable telescoping structures are shown in commonly assigned, concurrently filed application Ser. No. 07/961,654 (now Thorp U.S. Pat. No. 5,224,076) and Ser. No. 07/963,413, both of which are hereby incorporated by reference herein. Alternatively, instead of pivoting out from a main member about axes which are parallel to the longitudinal axis of the user's wrist when the apparatus is worn as a wristwatch, the secondary members like members 34 and 36 could pivot out from the main member about axes which are substantially perpendicular to the wrist axis and approximately tangent to the circumference of the wrist (see, for example, the pivotal connections about axes 32 in Seager U.S. Pat. No. 5,218,577, the pivotal connections about axes 34 in commonly assigned, concurrently filed application Ser. Nos. 07/961,655 and 07/961,652, and the pivotal connections about axes 31 in commonly assigned, concurrently filed application Ser. No. 07/962,353, of which applications are hereby incorporated by reference herein). As still another example of a possible modification, elements 42, 44, 46, 50, and 52 can be placed at any desired locations on the apparatus. Wristband portion 20 may also take many forms, including a C-shaped bracelet form. Portion 30 may be removably secured to portion 20 by various means other than by the depicted arrowhead snap 26. For example, a velcro connection may be used.

The invention claimed is:

1. Apparatus which is convertible between a relatively compact form suitable for wearing on the wrist as a wristwatch and an elongated form suitable for use as a hand-held radiotelephone with a microphone and a speaker adjacent respective opposite ends of said elongated form comprising:
   a substantially rigid main body member having a longitudinal dimension; and
   a substantially rigid secondary member having a longitudinal dimension and being movably mounted on said main body member by mounting means which permits the secondary member to move relative to said main body member between (1) a first position associated with said compact form in which said members are adjacent to one another and the longitudinal dimensions of said members are substantially superimposed on one another, and (2) a second position associated with said elongated form in which said members are still adjacent to one another but the longitudinal dimension of the secondary member extends beyond the longitudinal dimension of said main body member and additively combines with the longitudinal dimension of the main body member to produce a combined longitudinal dimension which is substantially greater than the longitudinal dimension of either of said members individually, said microphone being attached to one of said main and secondary members at a location which is remote from the other of said main and secondary members when said secondary member is in said second position, and said speaker being attached to said other of said main and secondary members at a location which is remote from said one of said main and secondary members when said secondary member is in said second position so that said microphone and speaker are respectively adjacent opposite ends of said elongated form to permit substantially simultaneous use of said microphone and speaker respectively adjacent the mouth and ear of a user who holds said elongated form along the side of the user' face.

2. The apparatus defined in claim 1 wherein said mounting means comprises:
a pivotal connection between said members adjacent one end of the longitudinal dimension of each of said members.

3. The apparatus defined in claim 2 wherein said pivotal connection allows said members to pivot relative to one another by approximately 180°.

4. The apparatus defined in claim 3 wherein said pivotal connection allows said members to pivot relative to one another by no more than about 180°.

5. The apparatus defined in claim 1 further comprising:
means for attaching said members to a user's wrist.

6. The apparatus defined in claim 5 further comprising:
means for removably connecting said members to said means for attaching.

7. The apparatus defined in claim 5 wherein said means for attaching comprises:
a wristband which encircles the user's wrist.

8. The apparatus defined in claim 5 wherein said mounting means comprises:
a pivotal connection having a pivot axis substantially parallel to the user's wrist when said members are attached to a user's wrist.

9. The apparatus defined in claim 1 further comprising:
a substantially rigid tertiary member having a longitudinal dimension and being movably mounted on one of said main and secondary members by further mounting means which permits the tertiary member to move relative to said main and secondary members between (1) a first disposition associated with said compact form in which said tertiary member is adjacent to at least one of said main and secondary members and the longitudinal dimension of said tertiary member is substantially superimposed on the longitudinal dimension of at least one of said main and secondary members, and (2) a second disposition associated with said elongated form in which said tertiary member is still adjacent to at least one of said main and secondary members but the longitudinal dimension of the tertiary member extends beyond said combined longitudinal dimension and additively combines with said combined longitudinal dimension o produce a further combined longitudinal dimension which is substantially greater than said combined longitudinal dimension, one of said microphone and speaker being attached to said tertiary member at a location which is remote from both said main and secondary members when said secondary member is in said second position and said tertiary member is in said second disposition.

10. The apparatus defined in claim 9 wherein said further mounting means comprises:
a second pivotal connection between said tertiary member and said one of said main and second members adjacent one end of the longitudinal dimension of each of said tertiary member and said one of said main and secondary members.

11. The apparatus defined in claim 10 wherein said further pivotal connection allows the members connected by said further pivotal connection to pivot relative to one another by approximately 180°.

12. The apparatus defined in claim 11 wherein said further pivotal connection allows the members connected by said further pivotal connection to pivot relative to one another by no more than about 180°.

13. The apparatus defined in claim 12 wherein said mounting means and said further mounting means are disposed adjacent respective opposite ends of the longitudinal dimension of said main body member.

14. The apparatus defined in claim 13 wherein said microphone and said speaker are respectively disposed in said secondary and tertiary members at locations which are adjacent respective opposite ends of said further combined longitudinal dimension.

15. The apparatus defined in claim 13 wherein said mounting means and said further mounting means respectively comprise first and second pivotal connections between said main body member and said secondary and tertiary members respectively.

16. The apparatus defined in claim 15 wherein said first and second pivotal connections have respective first and second pivotal axes which are substantially parallel to one another.

17. The apparatus defined in claim 16 wherein said first and second pivotal connections allow said secondary and tertiary members to be pivoted relative to said main body member so that all of said members are substantially parallel to one another and superimposed on one another.

18. The apparatus defined in claim 17 further comprising:
display means mounted on said main body member.

19. The apparatus defined in claim 18 wherein each of said secondary and tertiary members has an aperture through which said display means remains visible even when all of the said members are superimposed on one another.

20. The apparatus defined in claim 1 further comprising:
a radiotelephone dialing keypad disposed on one of said members.

* * * * *